(12) United States Patent
Chapman

(10) Patent No.: US 6,431,577 B1
(45) Date of Patent: Aug. 13, 2002

(54) TRAILER HITCH SUPPORT BODY

(76) Inventor: Jeffrey L Chapman, 905 Avalon Ave., Brunswick, GA (US) 31521

( * ) Notice: Subject to any disclaimer, the term of this patent is extended or adjusted under 35 U.S.C. 154(b) by 0 days.

(21) Appl. No.: 09/681,885

(22) Filed: Jun. 20, 2001

(51) Int. Cl.⁷ .................................................. B60P 53/08

(52) U.S. Cl. ...................... 280/491.5; 410/82; 414/494; 280/901

(58) Field of Search ................................ 280/511, 433, 280/491.5, 495, 901; 296/35.3; 410/55, 79, 80, 82, 83, 81; 414/494

(56) References Cited

U.S. PATENT DOCUMENTS

| | | | | |
|---|---|---|---|---|
| 3,390,896 A | * | 7/1968 | Philapy | 280/423.1 |
| 4,643,443 A | * | 2/1987 | Husa | 280/423.1 |
| 5,509,682 A | | 4/1996 | Lindenman et al. | |
| 6,158,761 A | * | 12/2000 | King | 280/495 |

* cited by examiner

Primary Examiner—Kevin Hurley
(74) Attorney, Agent, or Firm—Rigdon Patents & Engineering; Jonathan R. Smith

(57) ABSTRACT

Bodies for hook lift shuttles and other roll-off loaders are fitted with trailer towing hitches, such as fifth wheels and hitch balls, so that when one of these bodies is loaded onto a shuttle or loader, the shuttle or loader can be used temporarily as a tractor for a trailer.

13 Claims, 14 Drawing Sheets

TRAILER HITCH SUPPORT BODY

BACKGROUND OF INVENTION

This invention relates to towing of vehicles, in particular towing of trailers, and more specifically to towing of semitrailers. It also relates to truck bodies, more specifically to removable and interchangeable truck bodies, and still more specifically to "hook lift", cable hoist, and chain hoist "roll-off" loaders, and other specific types of trucks constructed to handle such bodies.

Relevant background in the field of trailer towing is as follows: A tractor for pulling semitrailers is commonly equipped rearwardly with a support bearing called a "fifth wheel", which engages a pin called a "kingpin" on the forward end of the trailer. When so engaged, the tractor-trailer combination comprises an articulating vehicle in which the trailer can rotate about a vertical axis relative to the tractor.

Trailers can be towed in similar fashion using other mating bearing combinations such as ball hitches. Ease of hitching and unhitching trailers is an important factor for logistical reasons in the design of tractors, trailers, and hitching mechanisms.

Background in the other related field is as follows: In the handling of bulk materials such as solid waste, it is common to use so-called "roll-off" containers to collect and transport the materials. These containers, called "bodies", come in various shapes and capacities and are adapted to be loaded onto and transported by shuttle trucks specially configured to load and unload them. Some roll-off bodies are more specialized, such as a flat bed for carrying earth-moving machinery. There are various types of shuttle trucks for handling roll-off containers. A hoist roll-off shuttle of the cable or chain variety comprises a chassis with a hydraulic lift bed, a winch, and a cable or chain. The bed comprises rollers to enable roll-off bodies to be winched onto and off of the bed. The hook lift truck also comprises a chassis with a hydraulic lift bed, but instead of a winch, it uses a hydraulically-articulated arm and hook to grasp a hook lift body and pull it onto or lower it from the bed.

The present invention relates these two fields in a novel way as summarized below.

SUMMARY OF INVENTION

The present invention is a removable, e.g., hook lift, body for a shuttle truck, which has been specially constructed to comprise a trailer-towing bearing such as a fifth wheel or a hitch ball. Such construction further comprises means for securely fastening the body to the shuttle so as to maintain the body in rigidly fixed relation to the chassis of the shuttle at all times. The virtue of such a body is that it enables roll-off shuttles to be used temporarily as tractors for semitrailers. This has the potential to reduce or eliminate the need for owning and maintaining dedicated tractors for semitrailers. Conversely, it can expand the capabilities of a fleet of roll-off shuttle vehicles to include trailer towing.

It is therefore a primary object of this invention to provide new means for towing trailers. It is a further object of this invention to provide a method of manufacturing or modifying roll-off shuttle beds for the secure installation and placement of such means. It is yet another object of this invention to provide a method of installing such means on such shuttle beds. Other objects of this invention are to expand the uses for roll-off shuttle trucks and to reduce the overall capital and maintenance costs for truck fleets.

DETAILED DESCRIPTION

Figure 1:
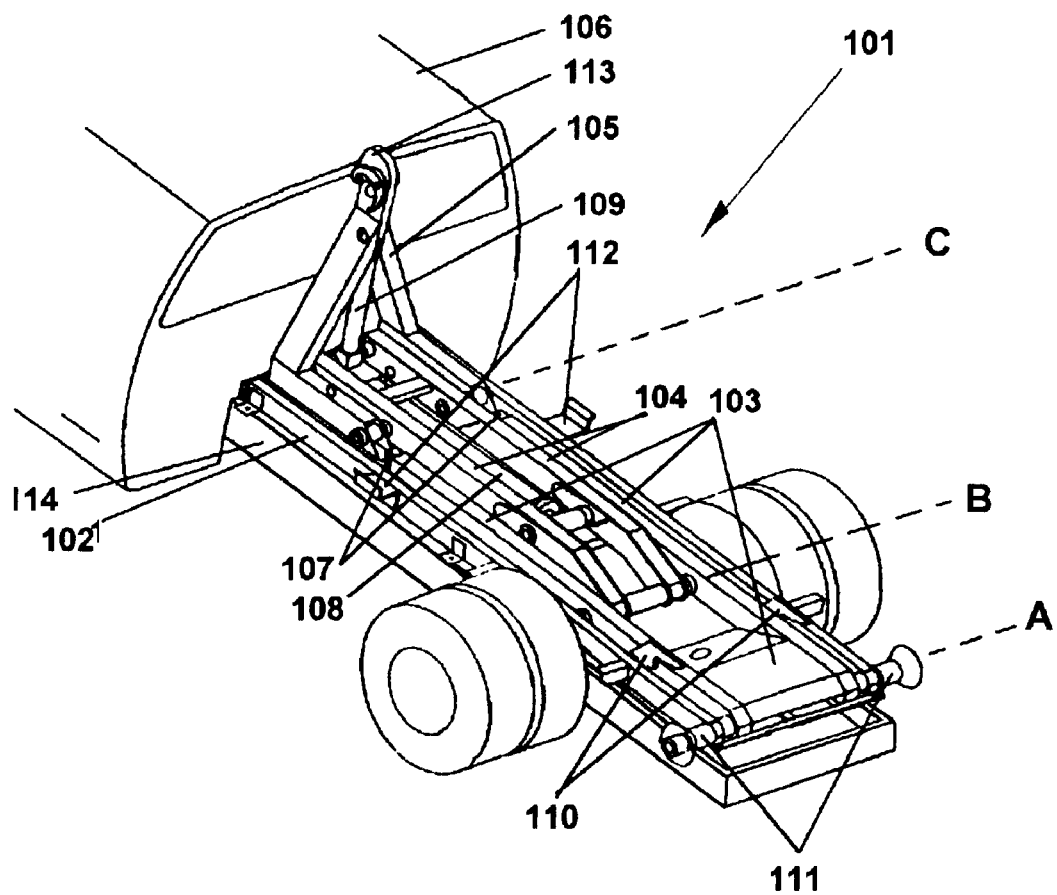
FIG. 1 is a perspective view of a hook lift roll-off shuttle known in the art, without a body in place.

Referring now in greater detail to the drawings, in which like numerals refer to like elements in all of the figures, FIG. 1 is a perspective view of a hook lift shuttle known in the art. The shuttle shown is typical of the hook lift type but there are other shuttles with dissimilar shapes also used to handle interchangeable bodies. The present invention is a body not to be construed to operate only with the shuttle depicted in FIG. 1. This will become apparent in further discussion.

The shuttle of FIG. 1 is shown without any body in place on the bed. It comprises a multi-axle truck with a specialized hydraulically-actuated bed 101 affixed to its chassis. The bed 101 further comprises in relevant part four interconnected sections: a base section 102 fixed to the truck chassis 114; a primary or dump section 103 rotatably attached to the base section 102 along axis A; a secondary section 104 also rotatably attached to the base section 102 along axis B; and a tilt section 105 rotatably attached to the secondary section 104 along axis C.

The dump section 103, secondary section 104, and tilt section 105 may be locked into rigid relationship by remote-controlled dump latches 107. An operator can then move all three bed sections into dumping position (about axis A) by actuating hydraulic lift cylinder 108. If dump latches 107 are unlocked, lift cylinder 108 can rotate secondary section 104 and tilt section 105 independently of dump section 103 about axis B. The tilt cylinder 109, by expanding hydraulically along its own axis, can rotate tilt section 105 about axis C as desired. The operation and function of the various parts are further illustrated in FIG. 9.

Other relevant parts of the prior art shuttle are body latches 110, which hold the rear of a shuttle body in fixed relation to the rest of the truck while the truck is in motion, rear rollers 111, which guide a body into position on the bed when it is being loaded, and saddles 112, which provide further resistance to side-to-side shifting of the load in transit. Also note hook assembly 113, which is used to grasp, move, and hold lift bodies designed to be handled by such shuttles.

Figure 2:
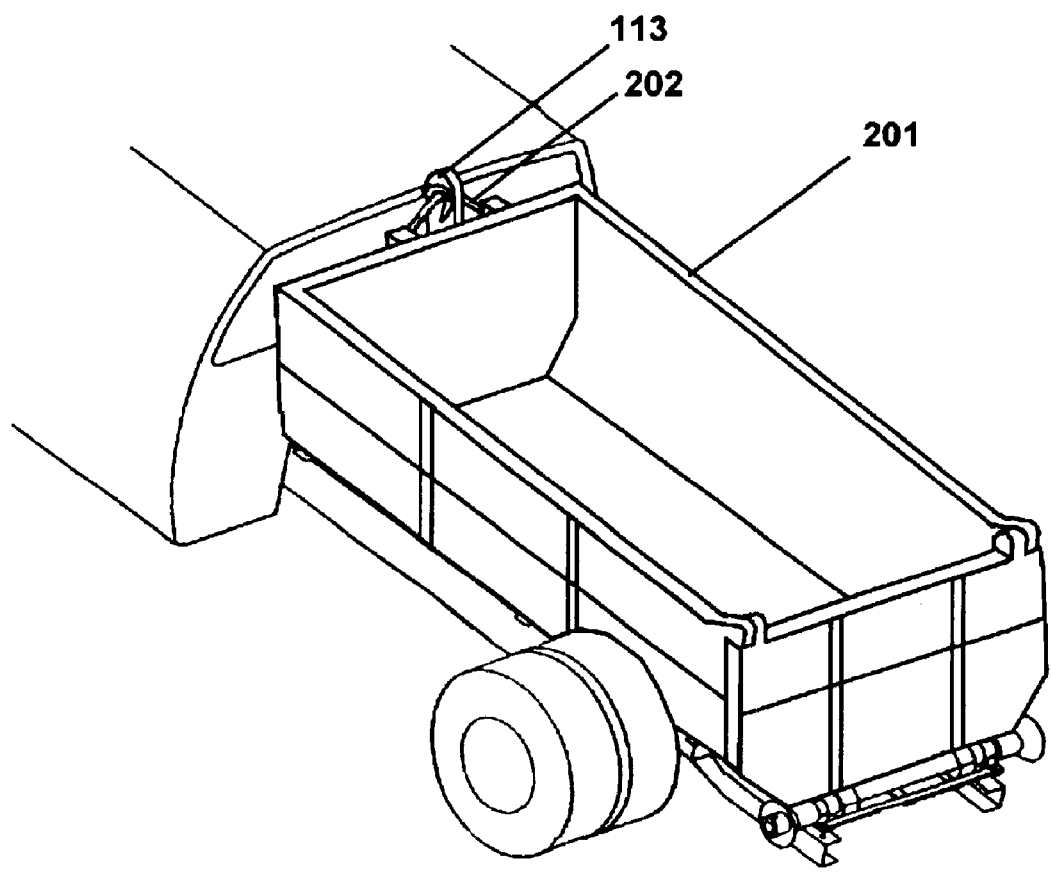
FIG. 2 is a perspective view of a portion of the shuttle of FIG. 1 with a prior art dump body in place.

FIG. 2 is a perspective view of a portion of the shuttle of FIG. 1 with a prior art dump body 201 in place. Note curved pin 202, rigidly attached to the upper front of the body 201, passing through hook assembly 113.

Figure 3:
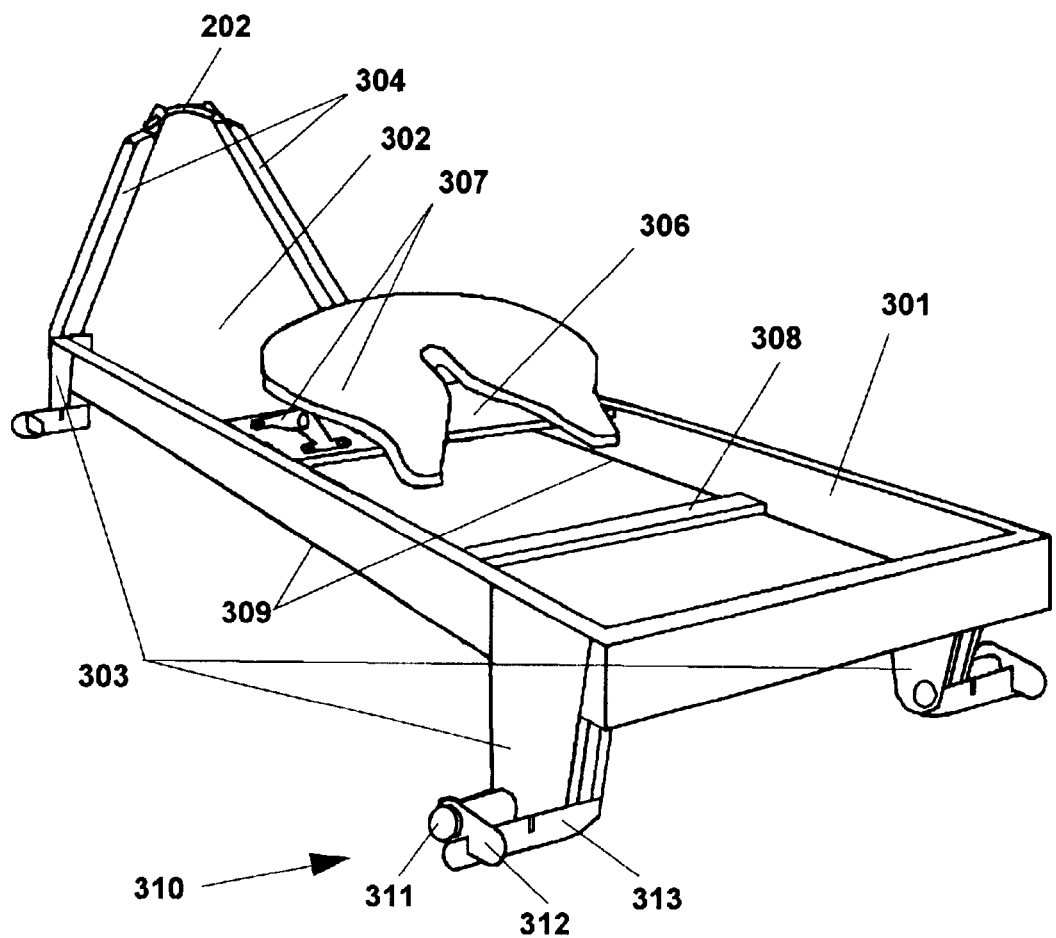
FIG. 3 is a perspective view of the first embodiment of the present invention configured to comprise a fifth wheel.

FIG. 3 is a perspective view of the first embodiment of the present invention, a fifth wheel support. It comprises a rigid rectangular frame 301 having one open end 302 at its front. Four legs 303 are attached to the frame near its corners and depend from it. The open end 302 of the frame 301 has attached to either side of it the lower ends of two pin supports 304 which extend upward from the plane of the frame 301 and diagonally towards each other. The upper ends of the pin supports are joined together by a curved pin 202. Spanning the middle of frame 301 is platform 306, which supports a fifth wheel trailer hitch 307. Also spanning the underside of the platform 306 is an optional cross member 308 for further body attachment security.

When this fifth wheel support is installed on a shuttle truck, as described further in subsequent figures, pin 202 is encircled by a hook assembly 113 (not shown) and the bottom edges 309 of frame 301 rest upon saddles 112 (not shown) and upon other horizontal members of the truck (not shown). Each leg 303 provides a further means of securement to the truck chassis 114 (not shown) by a tubular locking pin mechanism 310 consisting of a pin 311, a pin tab 312, and a tongue 313 at each of the four legs. This means of attachment is more clearly illustrated in FIGS. 6 and 7.

Figure 4:
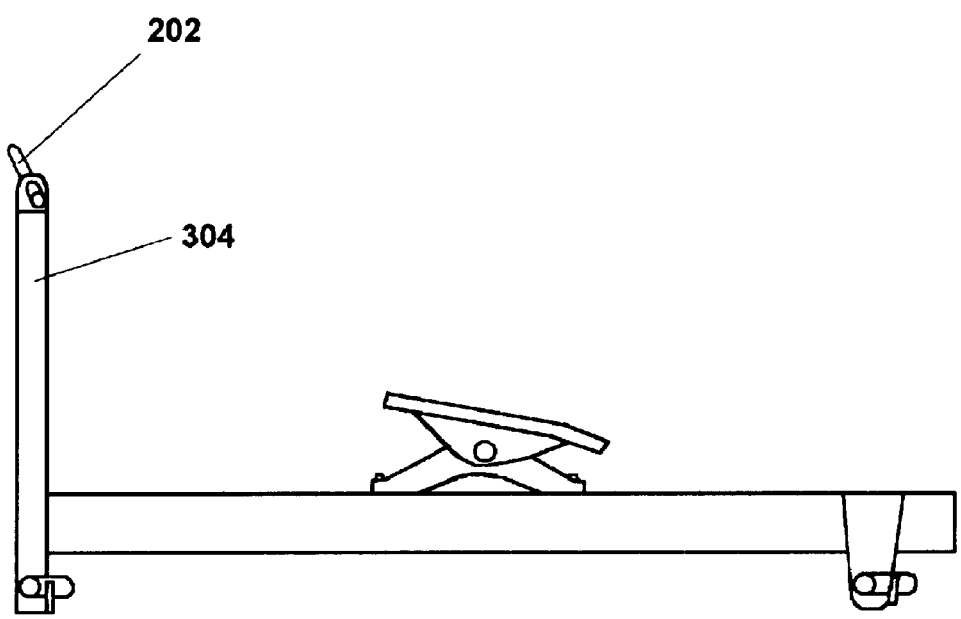
FIG. 4 is a side view of the first embodiment.

FIG. 4 is a side view of the first embodiment. Note that curved pin 202 lies in a plane that is not vertical; i.e., the apex of the pin is forward (to the left of) the pin supports 304 so that it can be held on a truck bed without interfering with the tilt section 105 (not shown) of the truck bed.

Figure 5:
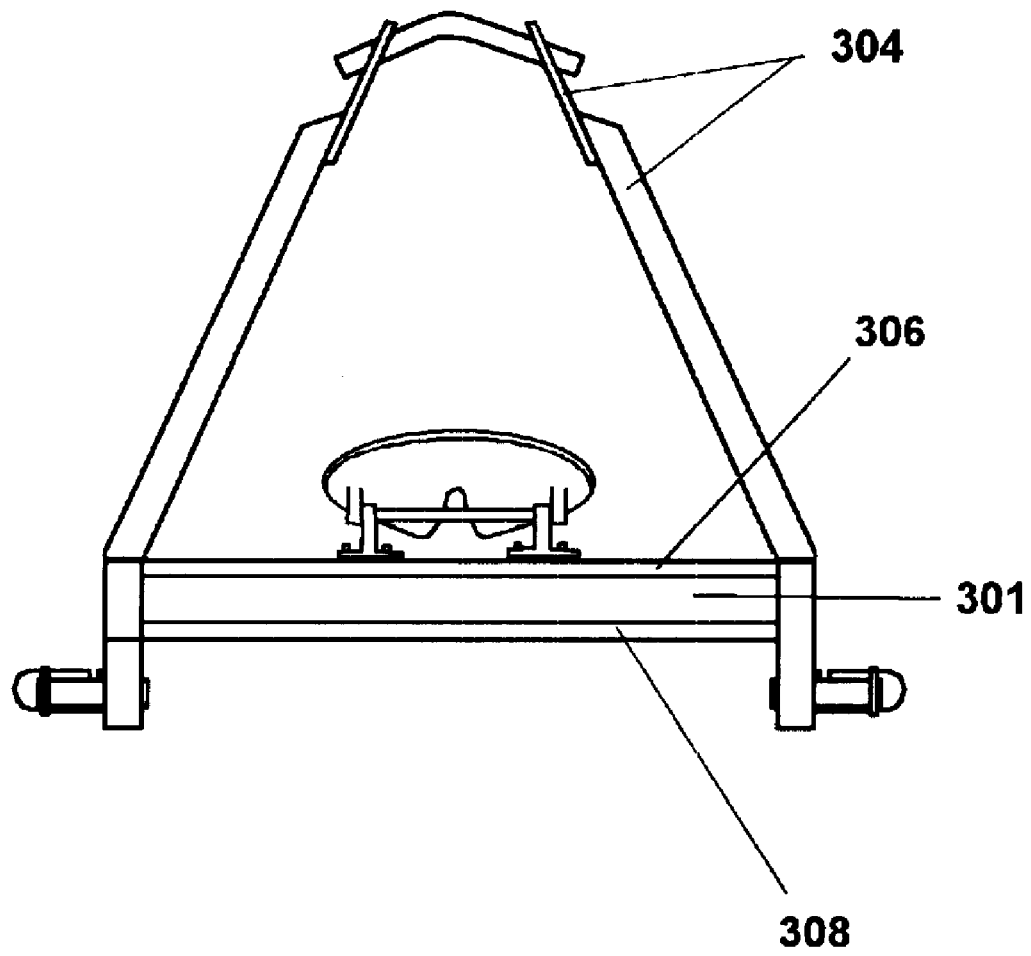
FIG. 5 is a front view of the first embodiment.

FIG. 5 is a front view of the first embodiment. Note that in this prototypical example, the pin support 304 consists of two pieces of rigid material welded together for ease of assembly. Also it can be seen in this view that the platform 306 is even with the top of frame 301, and the cross member 308 is even with the bottom. These locations are a fit with the shuttle depicted in FIG. 1, but many other configurations are possible within the scope of this invention.

Figure 6:
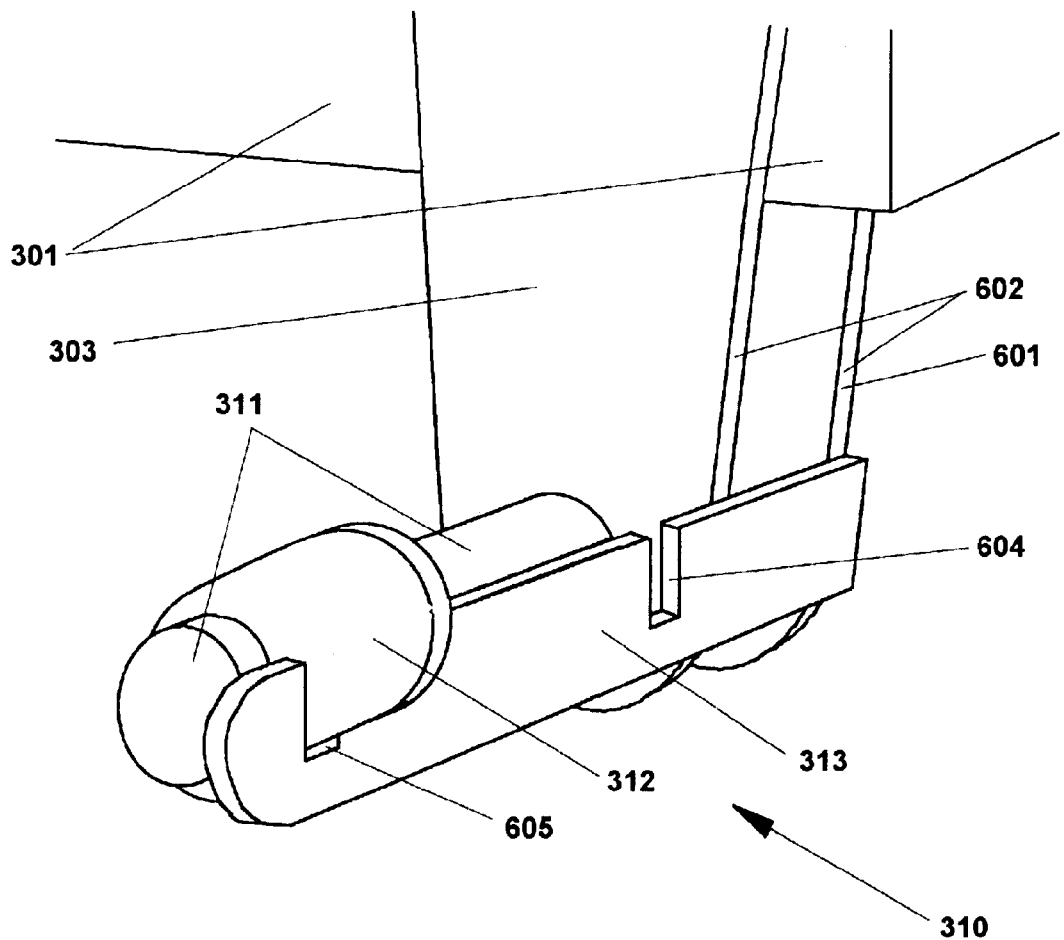
FIG. 6 is a perspective view of the locking pin mechanism of the present invention in the retracted (unlocked) position.

FIG. 6 is a perspective view of the locking pin mechanism 310 of the present invention in the retracted (unlocked) position. The mechanism 310 is installed at the lower end of each leg 303 of the fifth wheel support. In this illustration, the leg consists of two plates 601 and 602 depending from frame 301, although the leg could be made from other elongate materials such as, for one example, a single solid piece of rigid material, or for another example, a piece of rigid material having a hollow rectangular cross section. In this illustration, a circular hole 603 is cut horizontally through both plates so that tubular pin 311 can slide smoothly though it. The pin is of a length that when one end of the pin is flush with one side of the leg, the pin projects outward from the other side of the leg by several inches. An elongate tongue 313 is fixedly attached to the bottom of the leg so that it extends outwardly from the frame 301 and at least as far beyond one side of the leg as the pin 311 does. A pin tab 312 is fixedly attached to one end of the pin so that the tab 312 is on the same side of the leg 303 as the tongue 313. The tongue 313 further comprises a proximal notch 604 and a distal notch 605, both cut downward from the top edge of the tongue 313. By use of these notches, the tubular pin 311 can be locked into either of two horizontal positions. If pin tab 312 is lowered into distal notch 605 (as shown), it is held there by gravity and pin 311 will be held in its farthest displacement away from the truck body until the tab is lifted. If the tab 312 is lowered into the proximal notch 604, the pin 311 will project inwardly from the frame.

Figure 7:
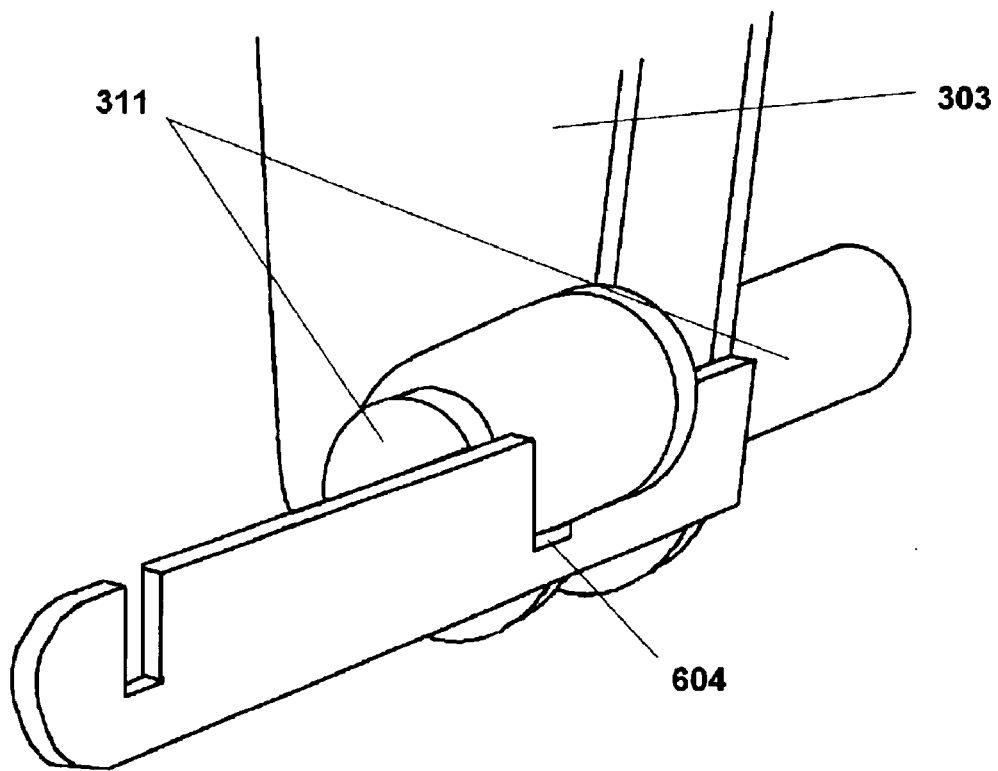
FIG. 7 is a perspective view of the locking pin mechanism of the present invention in the advanced (locked) position.

This is shown in FIG. 7, which is a perspective view of the locking pin mechanism 310 of the present invention in the advanced (locked) position. Note that the tubular pin 311 projects inwardly some distance from the leg 303. If the truck chassis (not shown) has a collinear round cavity of the same diameter of leg hole 603 (not visible), pin 311 can fit into this cavity and resist motion of the frame 301 in any direction relative to the truck chassis other than coaxial to the tubular pin.

Figure 8:
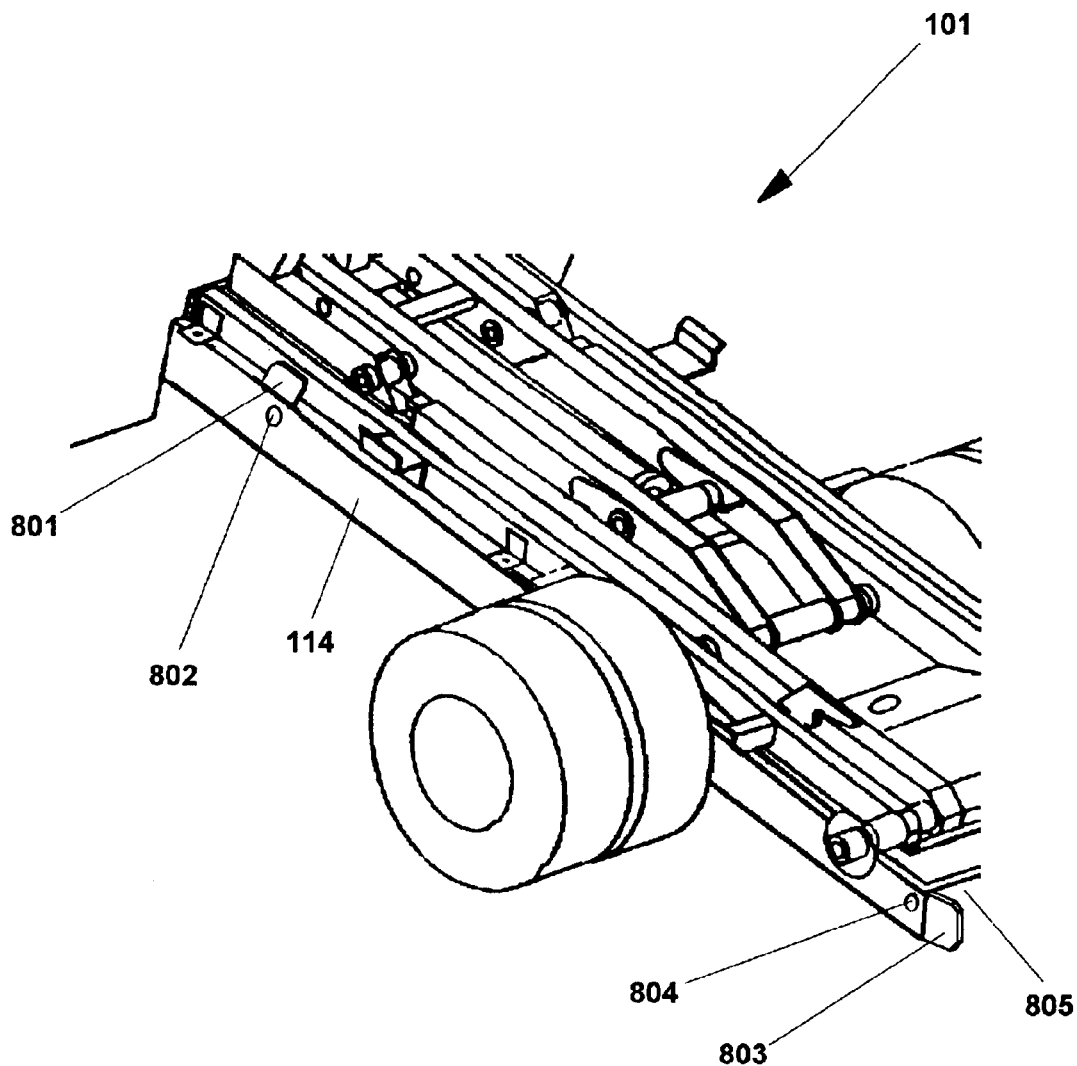
FIG. 8 is a perspective view of a portion of the chassis of the shuttle of FIG. 1 modified to accommodate the first embodiment of the present invention.

FIG. 8 is a perspective view of a the left side of the truck bed 101 of the shuttle of FIG. 1 modified to accommodate the first embodiment of the present invention depicted in FIGS. 3, 4, and 5. The modifications shown, which are duplicated in mirror image on the right side of the bed, comprise a forward ear 801, a forward pin socket 802, a rearward ear 803, and a rearward pin socket 804. The ears are fixedly attached to the truck chassis 114 at an angle towards the truck centerline. As will become clear in the next figure, the invention is installed on top of the truck bed 101 shown here. The two left legs of the invention (not shown) fit alongside (just to the left of) the visible side of the chassis 114. In like manner, the two right legs of the invention (not shown) fit alongside the right side (not shown) of the chassis. The final positioning of the first embodiment of the invention is shown more clearly in FIG. 10.

Figure 9:
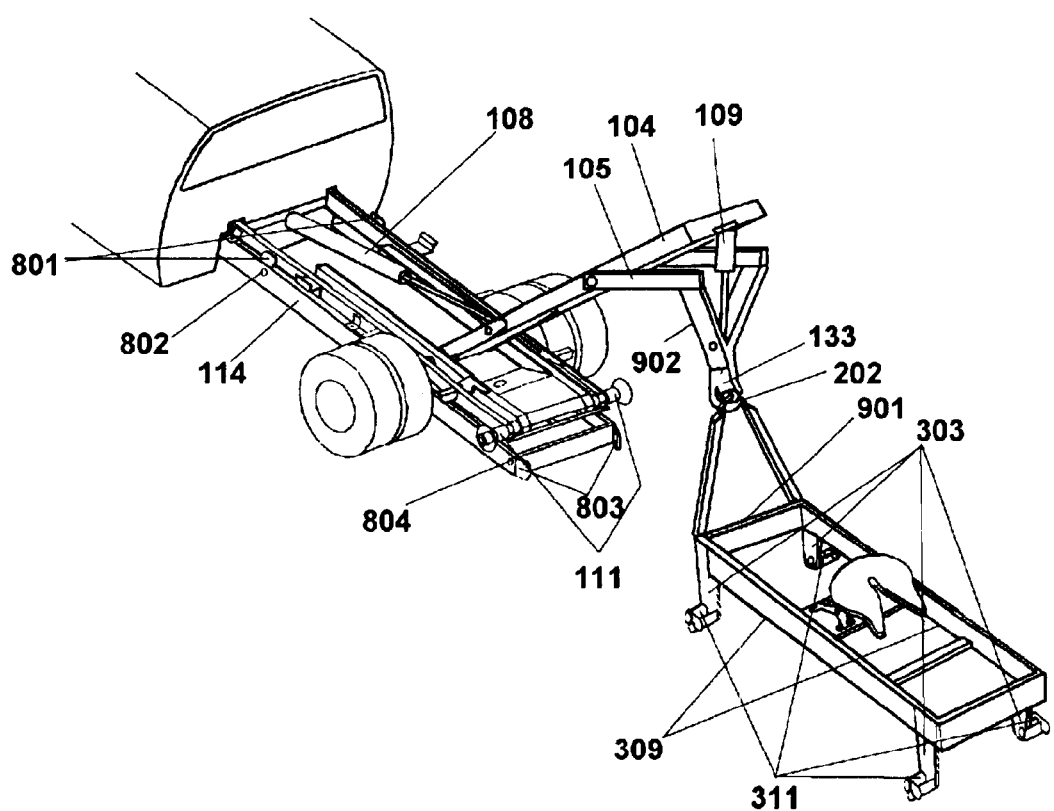
FIG. 9 is a perspective view of the shuttle of FIG. 1 with hydraulic sections raised and hook attached for installation of the first embodiment of the present invention.

FIG. 9 is a perspective view of the shuttle of FIG. 1 with the secondary bed section 104 and tilt section 105 raised and the hook assembly 113 attached to the first embodiment of the present invention. The invention is prepared for installation by making sure the locking pins 311 are in their retracted (fully out) positions, and that the curved pin 202 is grasped by the hook assembly 113. The invention is installed by using hydraulic cylinders 108 and 109 to lift the forward end 901 of the invention over the rear of the truck chassis so that forward legs 303 are above and forward of rollers 111. As the invention is pulled hydraulically farther forward, the rearward ears 803 serve to align the lower edges 309 of frame 301 onto the rollers 111. As the invention is pulled still farther forward, the forward end 901 of the invention must be held above the truck bed until the forward end 901 is near to contacting the rearward vertical face 902 of the tilt section 105 of the shuttle. The forward end 901 of the invention is then lowered into final position. Forward ears 801 serve to. prevent forward legs 303 from hanging up on top of the chassis 114. At this point, tubular pins 311 will line up with pin sockets 802 and 804. The pins 311 can then be advanced into the sockets and locked.

Figure 10:
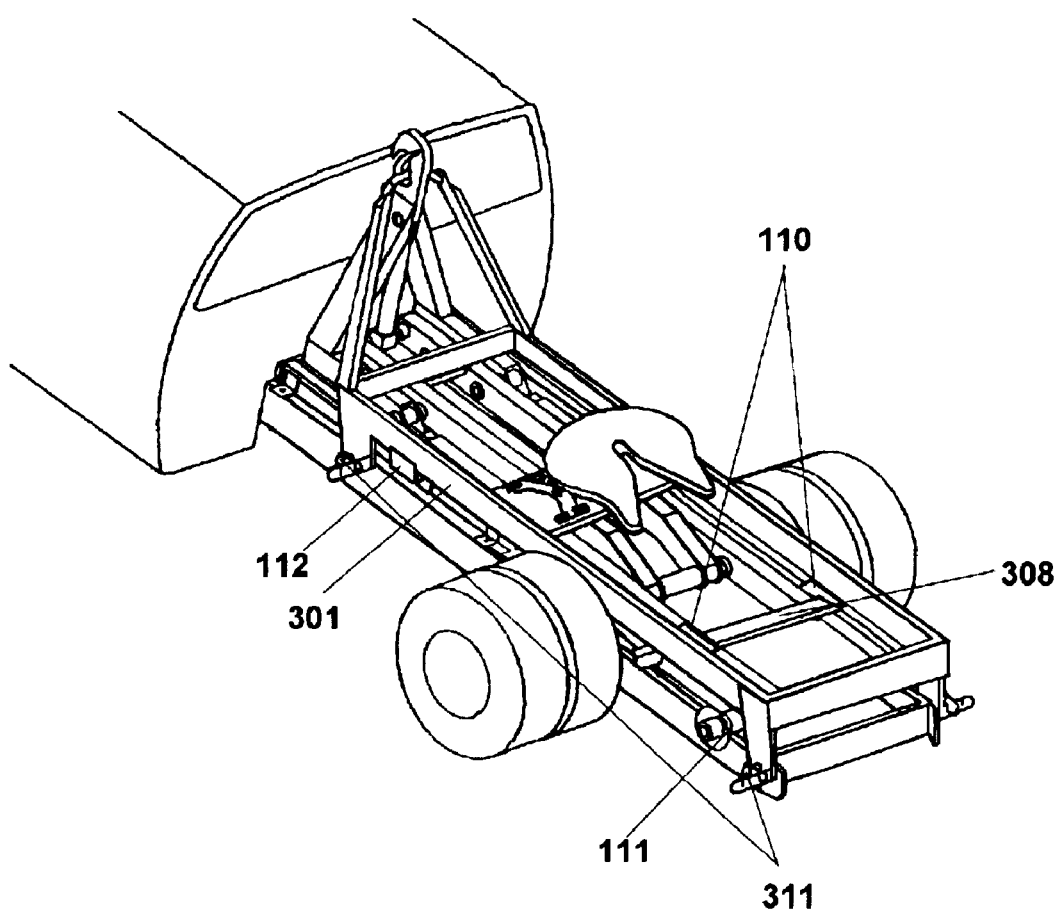
FIG. 10 is a perspective view of the shuttle of FIG. 1 with the first embodiment of the present invention secured in place.

FIG. 10 is a perspective view of the shuttle of FIG. 1 with the first embodiment of the present invention secured in place. Note that rectangular frame 301 rests in saddle 301 and rollers 111. Note further that cross member 308 is secured under body latches 110. Thus the invention is fixedly secured to the truck chassis by four pins 311, cross member 308, and curved pin 202. Fifth wheel 307 is now ready for engagement to the kingpin of a trailer (not shown).

Figure 11:
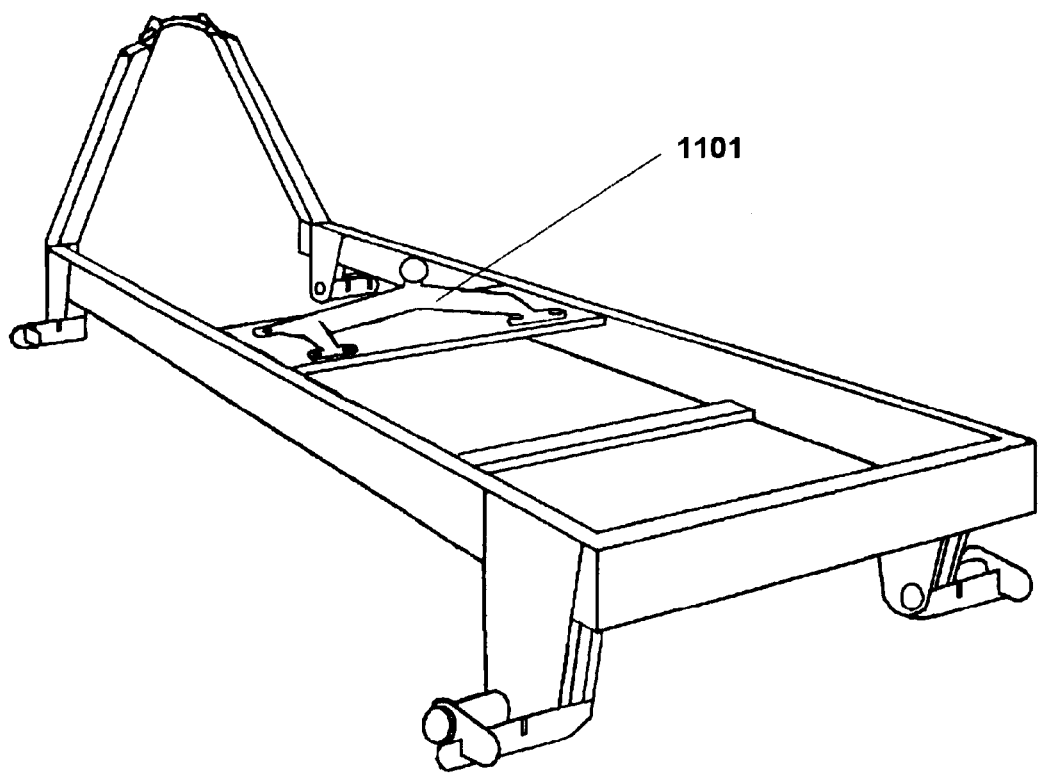
FIG. 11 is a perspective view of a second embodiment of the present invention.

FIG. 11 is a perspective view of a second embodiment of the present invention, configured to comprise a hitch ball. In this embodiment, a hitch ball assembly 1101 is substituted for fifth wheel assembly 307 in FIG. 3.

Figure 12:
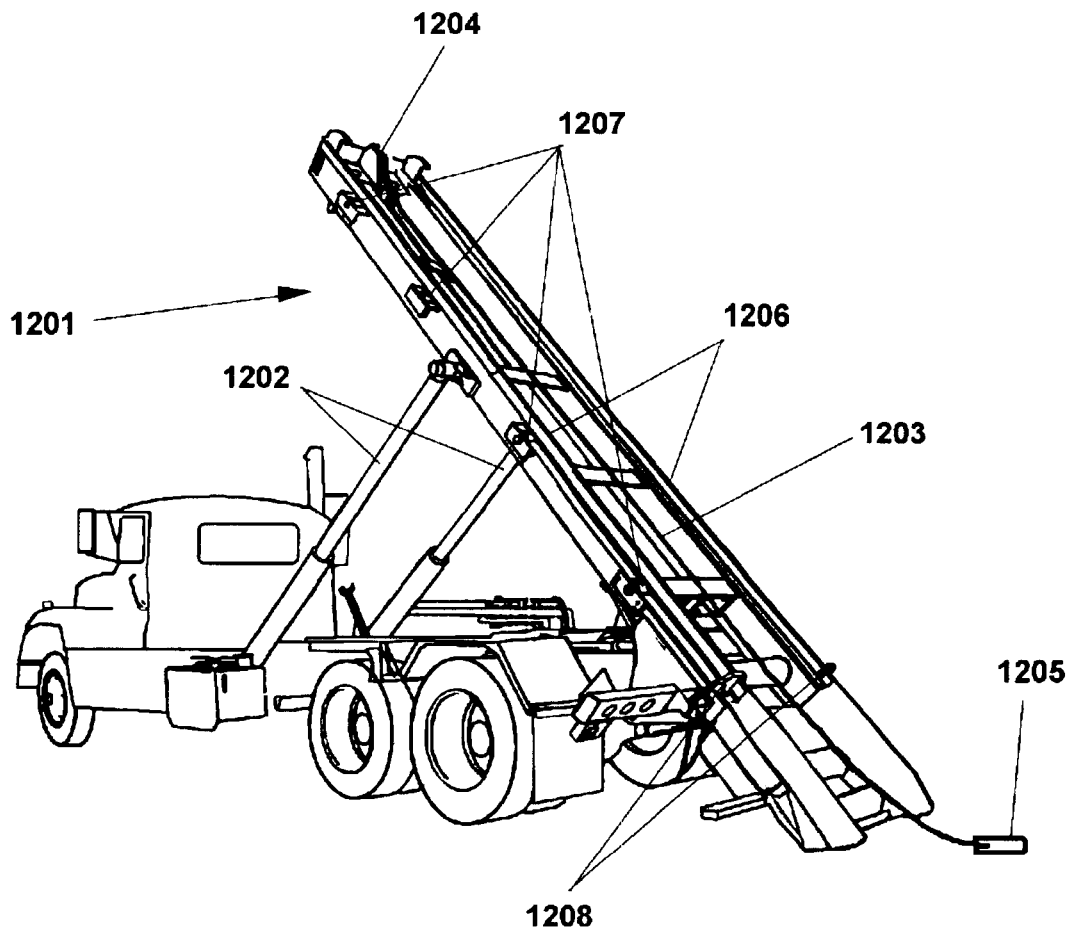
FIG. 12 is a perspective view of a cable hoist roll-off shuttle known in the art, without a body in place.

FIG. 12 is a perspective view of a cable hoist roll-off shuttle known in the art, without a body in place. It comprises in pertinent part a dump section 1201 capable of being raised as shown by parallel hydraulic cylinders 1202. A winch drum (not visible) pulls a cable 1203 over a sheave 1204. When clevis 1205 is attached to a hook (not shown) on a body made for use on such a shuttle (not shown), the body can be pulled onto the dump section by sliding over rails 1206 and rollers 1207 and may be secured to the shuttle by clamps 1208 and/or other securing devices such as straps (not shown).

Figure 13:
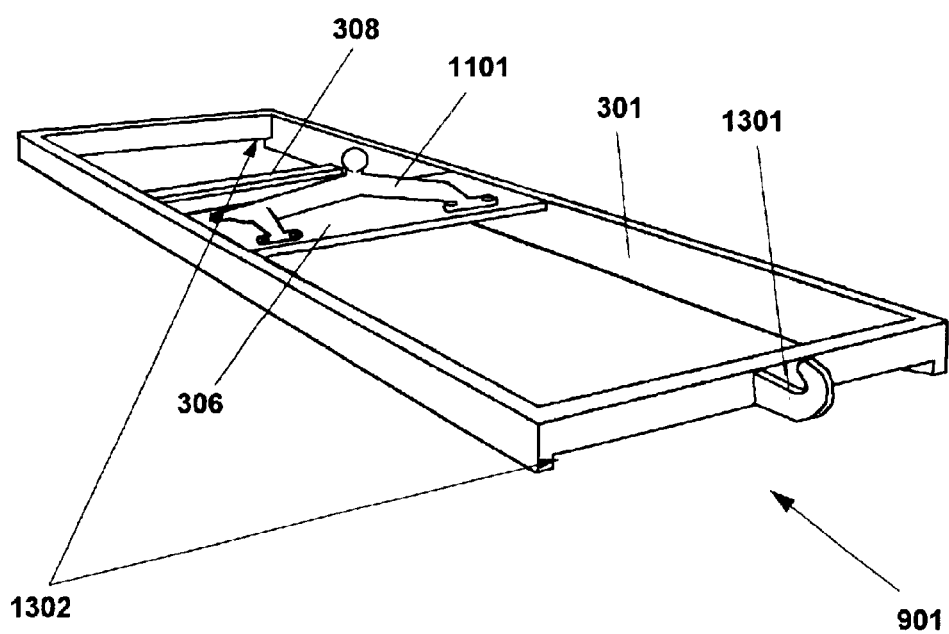
FIG. 13 is a perspective view of a third embodiment of the present invention.

FIG. 13 is a perspective view of a third embodiment of the present invention, which has the frame of the second embodiment reconfigured to permit installation on the cable roll-off shuttle of FIG. 12. For clarity it is shown facing the opposite direction as the embodiment shown in FIG. 11. Note that unlike the first two embodiments, the frame 301 encloses all four sides including forward end 901. An upward facing hook 1301 replaces the curved pin 202 of FIGS. 3 and 11. Note that the bottom edges of the forward and rearward ends 1302 of the frame 301 are recessed upward from the sides of the frame. This helps this embodiment straddle the rails 1206 of the dump section 1201 as it is being installed (shown in more detail in FIG. 14). Any method of alignment and fastening of bodies consistent with safety and the proper operation of the trailer hitch is acceptable.

Figure 14:
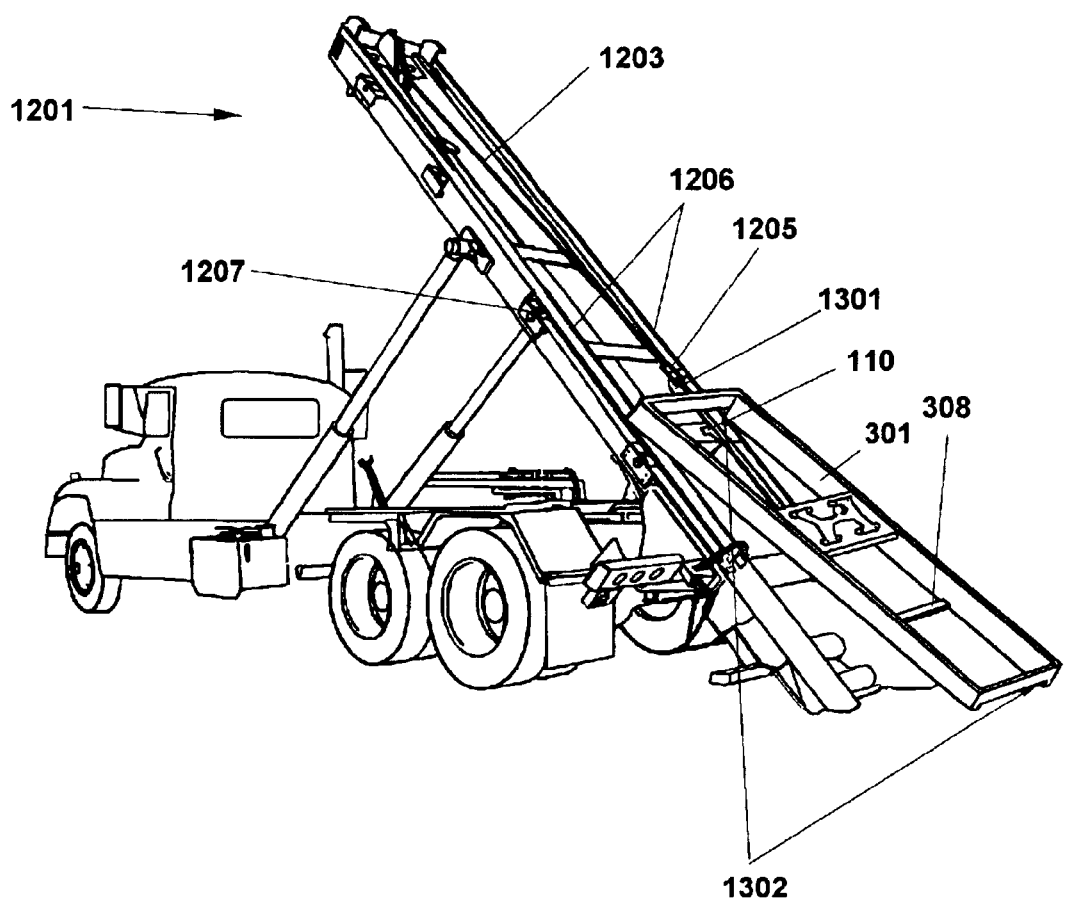
FIG. 14 is a perspective view of the third embodiment shown in FIG. 13 about to be installed on the cable hoist roll-off shuttle of FIG. 12.

FIG. 14 is a perspective view of the third embodiment shown in FIG. 13 being installed on the cable hoist roll-off shuttle of FIG. 12. Note that clevis 1205 of the shuttle has been attached to hook 1301, and cable 1203 has been winched upward to slide the third embodiment onto the dump section 1201 of the shuttle. Note that the right-hand rail 1206 of the dump section has been placed under the forward end 1302 of the frame, and the same is true of the left-hand rail and forward bar although not visible in this view. This centers the invention on the dump section as it is drawn upward by the winch. At a certain point in its upward travel, the frame 301 comes in contact with rollers 1207 on either side of the dump section, reducing the frictional load on the winch. If the dump section has been configured with body latches 110 (only one is visible), cross member 308 will engage them as the body nears the top of its travel, creating security against all motion of the body relative to the truck except rearward. Rearward motion of the body is prevented by the tension of cable 1203.

A fourth embodiment of the present invention combining the fifth wheel hitch assembly of the first embodiment (element 307 of FIG. 3) and the cable roll-off frame adaptations of the third embodiment (FIG. 13) is evident from these illustrations without an illustration of its own and is included within the scope of this invention.

While the tubular locking pin mechanism (element 310 in FIG. 3) is claimed matter in this invention as part of the first and second embodiments (FIGS. 3 and 11) of the invention, the invention is not meant to be limited to structures that conform solely to the two prior art shuttles shown in FIGS. 1 and 12, or these shuttles as modified for greater security in FIGS. 8 and 14. The present invention can be configured to fit securely virtually any truck chassis capable of loading assorted bodies.

There are also a number of other hitch systems that can be substituted for the two illustrated here (fifth wheel and ball) on the loadable bodies, and they are included within the claimed scope of this invention. Either mating part of any hitch system can be substituted for the fifth wheel or ball of the present invention and suitably affixed to the frame of the loadable body. All such possible hitch combinations cannot be drawn. Examples include, but are not limited to, the pintle hitch, in which a the fifth wheel plate or hitch ball of the present invention could be replaced by a vertical pin or mating eye bolt; and the clevis hitch, in which case it could be replaced by a clevis or a mating hook.

What is claimed is:

1. A trailer hitch body designed for a hook lift shuttle, the shuttle comprising a bed and an articulating hook assembly, the hook assembly having an inside diameter, the trailer hitch body comprising:

a substantially planar rigid frame having an upper side, a lower side, a front end, a rear end, and a periphery;

a mating part of a trailer hitch system rigidly attached to the upper side of the frame;

an elongate and substantially vertical rigid pin support member having a top end and a bottom end;

the bottom end of the pin support member being fixedly attached to the front end of the frame and extending substantially vertically upward therefrom;

a rigid pin attached to the top end of the pin support member, the rigid pin being shaped to engage flexibly and securely the hook assembly of the shuttle;

a plurality of rigid legs, each having an upper end and a lower end, all of the legs being rigidly attached their upper ends to the periphery of the frame at spaced intervals and depending downwardly therefrom;

the lower ends of the legs comprising means for rigidly and releasably engaging the bed of the shuttle at like spaced intervals.

2. The trailer hitch body of claim 1 wherein:

said mating part is either:
  a) a fifth wheel bearing plate, or
  b) a hitch ball.

3. The trailer hitch body of claim 2 wherein:

said pin support member is bifurcate at least at its top end;

said rigid pin is of an elongated cylindrical shape, having an axis, and being smaller in diameter than said inside diameter of said hook assembly;

said rigid pin is held fixedly between the bifurcations of the support member with its axis substantially horizontal and substantially perpendicular to the centerline of said shuttle, so that said hookassembly of said shuttle can securely suspend the body and swing the body freely about the axis of the rigid pin.

4. The trailer hitch body of claim 3 wherein said bed engaging means comprises:

a rigid cylinder horizontally and slidably disposed through each of said legs proximate to said lower ends of said legs;

each cylinder having an elongate tab extending from one end of the cylinder and at right angles to its axis;

each lower end further comprising an elongate rectangular flange extending in the same direction from each leg as each cylinder;

each flange comprising two upward-facing notches, one proximal to said leg and one distal to said leg;

both notches being wider than the tab on the end of the cylinder, so that the tab can fit into either the proximal or the distal notch, the tab being retained in a notch by its own weight;

the position of the notch creating an extended or retracted horizontal position, respectively, of the cylinder through the leg;

the extended position permitting the cylinder to engage a mating cavity on said bed;

the notch thereby preventing motion of the leg relative to the bed along the axis of the cylinder, and the cavity preventing motion in any other direction, when the cylinder is so engaged.

5. A trailer hitch support body, comprising:

a mating part of a trailer hitch system;

a frame for rigidly supporting the mating part;

the frame further comprising a front end and a rear end;

means for rigidly attaching and releasing the frame to and from a towing vehicle; and the towing vehicle further comprising a hook lift shuttle having a bed and articulated hooking means for positioning objects upon the bed.

6. The trailer hitch support body of claim 5 further comprising:

a handle means rigidly attached to the front end of said frame;

the handle means capable of being grasped by said hooking means.

7. The trailer hitch support body of claim 6 wherein:

said bed further comprises latches, and said attaching and releasing means further comprises bar means positioned to rigidly and releasably engage said latches when the body is positioned upon said bed.

8. The trailer hitch support body of claim 7 wherein:

said frame further comprises a plurality of rigid legs depending from said frame;

said legs each further comprising lock means;

said bed further comprising lock-receiving means for each lock means so that when said body is positioned on said bed, said lock means can be rigidly secured to said lock-receiving means.

9. The trailer hitch support body of claim 8 wherein:

said mating part is either:
 a) a fifth wheel trailer bearing, or
 b) a hitch ball.

10. The trailer hitch support body of claim 9 wherein:

said lock means further comprises a rigid horizontal elongate pin having a first axis, and having a round cross-section, slidably engaged to said leg through a hole in said leg, such that the pin can be manually translated collinearly along, and rotated about, the first axis within the hole;

the pin having rigidly affixed at one end an elongate tab having a thickness, and having a second axis not parallel to the first axis;

a rigid horizontal elongate tongue rigidly attached at one end to said leg and having an upper edge and a third axis, the third axis being substantially parallel to the first axis;

the upper edge having first and second horizontally-spaced notches wider than the thickness of the tab;

the pin being locked at a first horizontal position when the tab is positioned within the first notch, and being locked at a second horizontal position when the tab is positioned within the second notch, so that the pin protrudes from said leg a smaller amount and a larger amount, respectively;

the pin engaging said lock-receiving means when protruding the larger amount but not when protruding the smaller amount.

11. A trailer hitch support body, comprising:

a mating part of a trailer hitch system;

a frame for rigidly supporting the mating part;

the frame further comprising a front end and a rear end;

means for rigidly attaching and releasing the frame to and from a towing vehicle; and the towing vehicle further comprising a hoist roll-off shuttle having a bed and hooking means for positioning objects upon the bed.

12. The trailer hitch support body of claim 11 further comprising: a handle means rigidly attached to the front end of said frame; the handle means capable of being grasped by said hooking means.

13. The trailer hitch support body of claim 12 wherein: said bed further comprises elongate flanges parallel to the direction of roll-off, and said attaching and releasing means comprises runners positioned to slidably engage said flanges and restrain motion not parallel to the direction of roll-off when the body is positioned upon said bed.

\* \* \* \* \*